July 10, 1934.     H. C. JENSEN     1,966,035
SANITARY SUGAR BOWL
Filed Dec. 15, 1931

Inventor
Hans C. Jensen.
By Miller + Miller
Attorneys

Patented July 10, 1934

1,966,035

UNITED STATES PATENT OFFICE 1,966,035

SANITARY SUGAR BOWL

Hans C. Jensen, Sacramento, Calif.

Application December 15, 1931, Serial No. 581,224

3 Claims. (Cl. 221—112)

This invention relates to a sanitary sugar bowl and has for an object to provide an improved sanitary bowl for sugar or other condiments, wherein the contents will be kept free from possibility of contamination and may be released therefrom by tipping the bowl to pour out a measured quantity.

A further object of this invention is to provide an improved sugar bowl spout which will normally remain closed and when operated will allow a desired measured quantity of the contents to be released from the container and at the same time prevent any possibility of contaminating the remainder of the contents in the bowl.

Still a further object of this invention is to provide a sanitary sugar bowl wherein the contents will not be discharged therefrom should the same be accidentally tipped over on its side, and wherein only a limited measured amount will be discharged should the operating mechanism be accidentally operated.

Yet a further object of this invention is to provide a sugar bowl spout for delivering a measured quantity of sugar, which spout may be applied to a suitable container.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a partly sectional and partly elevational view of the sugar bowl and spout including this invention, the section being on line 1—1 of Figure 5.

Figure 1:
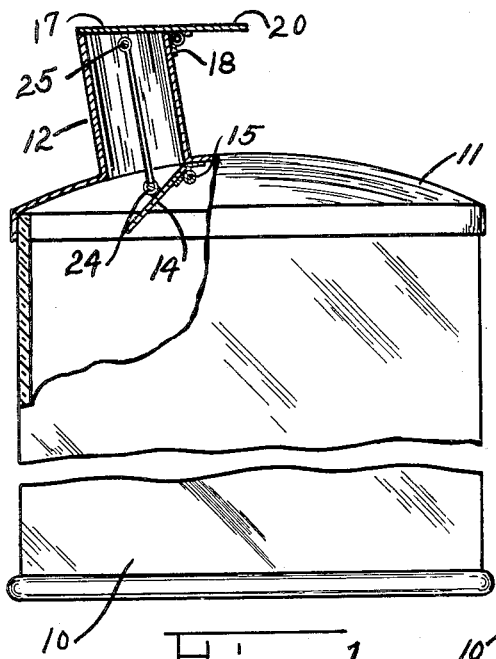

There is shown at 10 a container or bowl for sugar or other condiments having attached thereto a cover 11. As shown, the bowl 10 is of glass, but may suitably be of metal or any other material, the cover 11 being of metal, such as aluminum, stainless steel or other suitable non-tarnishable material. The cover 11 may be attached to the bowl 10 in any suitable manner, it being shown as being attached by a tight frictional grip, a suitable adhesive being used therewith if desired.

Affixed to the cover 11 is a discharge spout 12, preferably at one side of the center thereof. An inner lid 14 is hinged to the bottom of the cover at 15 and is of such area that it will completely close the opening through the cover 11 into the spout 12. Another lid 17 is hinged at 18 to the top of the spout 12, being large enough to completely close the exterior opening of the spout 12.

A spring 19 is provided in the hinge 18 while an operating lever 20 projects across the hinge 18 integrally from the lid 17. A pair of ears 21 is secured to the bottom of the lid 17 and a similar pair of ears 22 is secured to the top of the inner lid 14, a connecting rod 23 being pinned to the lid 14 and the lid 17 by means of pins 24 and 25 projecting through ears 22 and 21 respectively.

Figure 2:
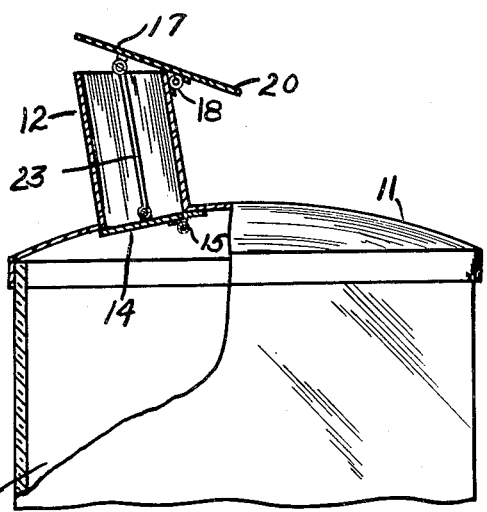
Figure 2 is a similar view to Figure 1 with the operating lever depressed to show the discharge position.
Figure 3:
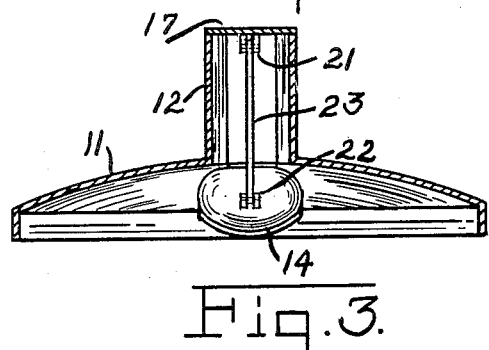
Figure 3 is a sectional view on line 3—3 of Figure 5.
Figure 5:
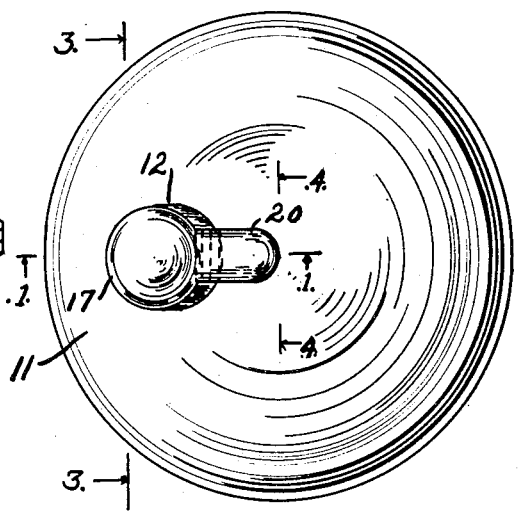
Figure 5 is a top plan view of the sugar bowl container and spout.
Figure 4:
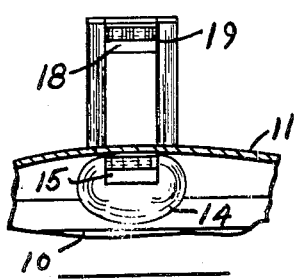
Figure 4 is a sectional view on line 4—4 of Figure 5.

In operation, the spring 19 serves to normally retain the lid 17 in closed position, as shown in Figure 1, and thus serves, through the connecting rod 23, to maintain the lid 14 in open position. The spout 12 is made of such a size that it will receive only a desired amount of sugar, as for instance one teaspoonful, it being obvious, however, that it may be made of any other measured size. In operation, the container or bowl 10 is tilted or up-ended allowing the sugar or other contained material to flow into spout 12, the spring 19 serving to retain the lid 17 closed and the lid 14 open. When in this position the operating lever 20 is depressed to the position shown in Figure 2, having the effect of opening the lid 17 allowing the measured amount of sugar to pour out of the spout 12. At the same time the connecting rod 23 serves to close the lid 14 to the closed position shown in Figure 2, thereby preventing any additional sugar from flowing into the spout, while the measured amount already in the spout is discharging therefrom. Thereafter, if the user desires an additional measured amount of sugar he merely releases the operating lever 20, whereby the spring 19 will again close the lid 17 and through the medium of connecting rod 23 open lid 14, allowing an additional similar amount of sugar to flow into the spout and the operation is repeated. Thus, if a person desires three teaspoons of sugar and the spout is of a size to discharge one teaspoonful at a time, he has merely to depress the operating lever three times, allowing the spout to discharge between each successive operation thereof.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. In a bowl, a measured discharge spout, a lid at each end of said spout, each lid being hinged to said end of said spout, means connecting said lids whereby only one of said lids may remain in closed position at one time, means tending to normally keep one of said lids in closed position, and operating means for opening said normally closed lid and closing said normally opened lid, whereby to allow the measured contents of said spout to be discharged therefrom.

2. In a sanitary sugar bowl, a measured discharge spout projecting therefrom, a lid hinged to the inner edge of said discharge spout and opening away from said spout, a second lid hinged to the outer end of said spout and opening away from said spout, a connecting rod pinned to the adjacent sides of said lids, spring means normally tending to close said outer lid, and an operating lever integrally connected to said outer lid for operating said lid against the action of said spring means.

3. In a sanitary sugar bowl, a measured discharge spout projecting therefrom, a lid hinged to the inner edge of said discharge spout and opening away from said spout, a second lid hinged to the outer end of said spout and opening away from said spout, ears on the sides of said lids adjacent said spout, a connecting rod pinned to said ears to operatively connect said lids, spring means normally tending to close said outer lid, and an operating lever integrally connected to said outer lid and projecting across the hinge means thereof for operating said lid against the action of said spring means to discharge a measured amount from said spout.

HANS C. JENSEN.